Dec. 18, 1928.
D. KUSKIN
1,696,044
WINDSHIELD WIPER
Filed July 1, 1927
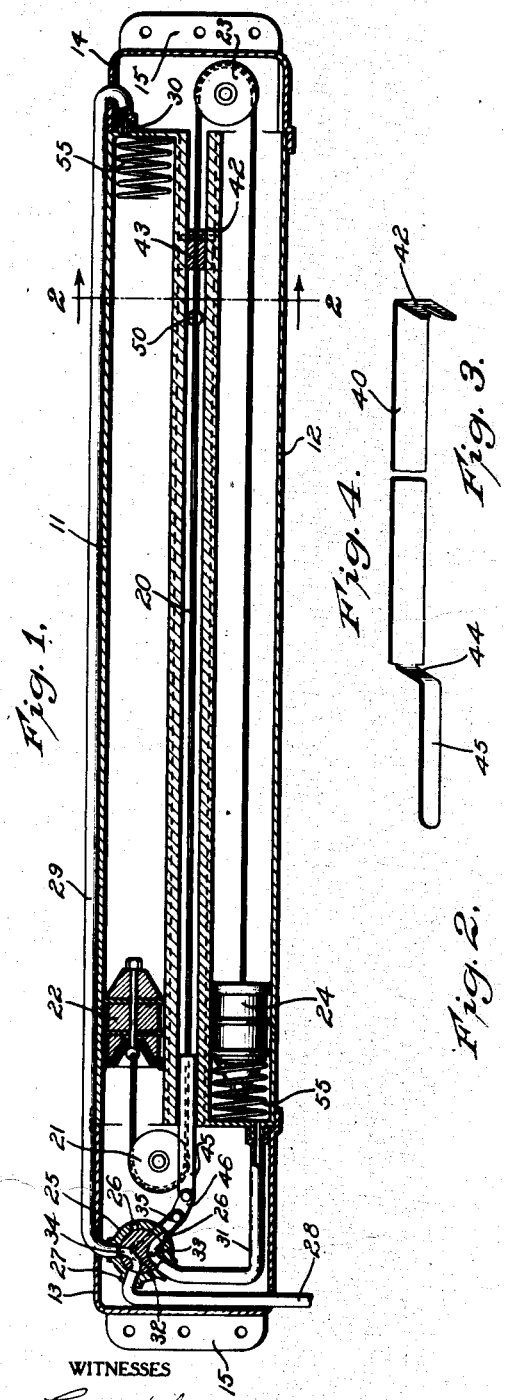
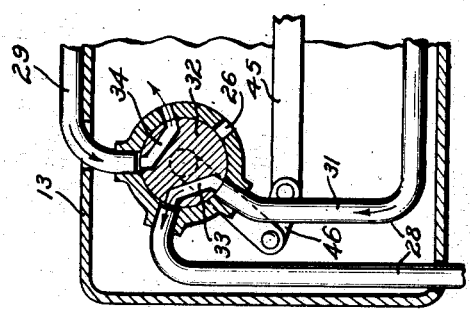
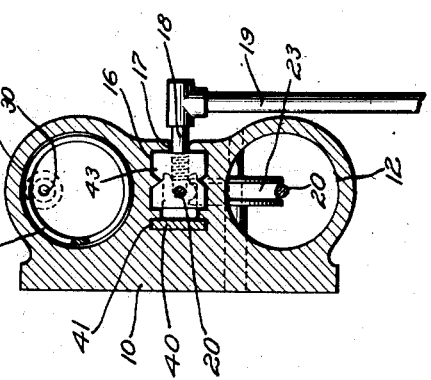
INVENTOR
DAVID KUSKIN
BY
ATTORNEYS Patented Dec. 18, 1928.

1,696,044

UNITED STATES PATENT OFFICE.

DAVID KUSKIN, OF NEW YORK, N. Y., ASSIGNOR TO FULL VIEW WINDSHIELD WIPER, INC., A CORPORATION.

WINDSHIELD WIPER.

Application filed July 1, 1927. Serial No. 202,873.

The present invention is concerned with the provision of improvements in automatic window cleaners which may have a wide range of utility. The invention finds its preferred embodiment, however, in a windshield wiper for automobiles and is of the character in which suction or low pressures created in the engine supply the motive power for actuating the wiper.

An object of the invention is to provide a device of this character so constructed that there will be no problem of air leakage which might destroy the differential pressures essential to successful operation of the power pistons.

Obviously, a single piston can not be reciprocated by differential pressures in a closed tube, since some means must be provided for connecting the piston and the wiper which it actuates. The use of such connecting means passing through the walls of the tube would necessarily involve leakage around the connecting means.

In accordance with the present invention I have overcome the above noted difficulty by the use of two tubes, each tube being open at one end and each tube housing a power piston, the pistons each connected by a flexible device which carries the wiper. Means is provided for alternately placing the closed ends of the cylinders in communication with a suction line and the atmosphere, such means being valve controlled through trip mechanism operated by the wiper.

Other and more general objects of the invention are to provide a windshield wiper of comparatively simple construction, having a minimum number of operating parts likely to get out of order, and a windshield wiper which may be conveniently installed and economically operated.

With the above noted and other objects in view, the invention consists in certain novel features of construction and combinations and arrangements of parts, as will be more fully hereinafter set forth and pointed out in the claims. The invention may be, more fully understood from the following description in connection with the accompanying drawings, wherein—

Fig. 1 is a longitudinal sectional view through a windshield wiper embodying the present invention.

Fig. 2 is an enlarged transverse sectional view on the line 2—2 of Fig. 1.

Fig. 3 is an enlarged sectional detail through the valve and its associate mechanism showing the position of the parts when the lower cylinder is in communication with the suction line.

Fig. 4 is a reduced perspective view of the valve trip member.

In the drawings I have used the reference numeral 10 to indicate a unitary body or casing formed with an upper cylinder 11 and lower cylinder 12 extending longitudinally thereof. The two integrally connected cylinders are parallel and each include a closed end and an open end. The open end of one cylinder is arranged adjacent the closed end of the other. The two ends of the body 10 are received in hollow casings 13 and 14 respectively, these casings being formed with projecting plate portions 15 adapted to be secured in any appropriate manner to an automobile just above the windshield.

Parallel to the cylinders 11 and 12 and disposed between them is a longitudinally extending passageway 16 in the body, said passageway having a longitudinal slot 17 in one wall thereof in which an arm 18 works. The outer end of the arm 18 is rigidly connected with the shank 19 of a windshield wiper (not shown) and the inner end of the arm 18 is connected by the intermediate portion to a block 43 on a flexible device 20 arranged within the passageway 16.

One end of the flexible device 20 is passed around a pulley 21 housed in the casing 13 and anchored to a power piston 22 sliding in the upper cylinder 11. The other end of the flexible device 20 is passed around a pulley 23 arranged in the casing 14 and through the open end of the lower cylinder 12 where it is anchored to a corresponding piston 24 working in the lower cylinder.

It will be seen that as the power pistons are alternately reciprocated in their cylinders the arm 18 which is attached to the flexible device 20 will be reciprocated in the slot 17 and the windshield wiper will be dragged back and forth across the face of the windshield. If the tubes are of the proper length the travel of the wiper may embrace the entire width of the windshield.

Means is provided for alternately admitting air through the closed ends of the cylinders and placing the closed ends of the cylinders in communication with a low pressure line. With this in view, a valve casing 25 is arranged within the casing 13. This valve casing has port 26 therein communicating with the outer end and a suction port 27 communicating with a suction line 28 which may run to any suitable source of suction, such for instance as the engine exhaust manifold. A pipe 29 entering the casing 25 communicates with the closed end of the cylinder 11 through a restricted passageway 30. A corresponding pipe 31 connects the closed end of the cylinder 12 with the valve casing 25.

Any suitable type of valve, such for instance as the rotary plug valve 32 is mounted in the valve casing 25 and provided with a pair of generally arcuate passages 33 and 34. An operating lever 35 is provided for shifting the valve from one extreme position to the other. Whenever the closed end of one cylinder is admitting air the other cylinder will be communicating with the suction line.

Means is provided for automatically shifting the valve operating lever 35 at the completion of each stroke of the wiper. Such means may include a trip member in the nature of an elongated flat plate 40 mounted for sliding movement in the grooves 41 of the passageway 16. Integrally with the plate 40 at one end is an ear 42 straddling the flexible device 20 and disposed in the path of movement of a block 43 which carries the arm 18. Near its other end the plate 40 is provided with an offset portion 44 apertured for the reception of flexible device. Beyond the offset an extension 45 of the member 40 is connected to the valve operating lever 35 by link 46.

As best seen in Fig. 1 the block 43 upon movement to the right engages the ear 42 sliding the plate 40 to the right and shifting the valve 32 to the position illustrated in Fig. 1. Movement of the block 43 to the left causes an enlargement 50 on the flexible device to engage the offset 44 of the trip member and shift the trip member bodily to the left reversing the position of the valve 32. This position of the valve is illustrated in Fig. 3.

The operation of the device is essentially as follows:

With the parts in the position of Fig. 1, piston 22 will move to the right due to the differential pressures existing in the cylinder 11. Inasmuch as pipe 31 at this time communicates freely with the outer air, piston 24 will not oppose such movement and the piston 22 needs only to overcome the frictional drag of the wiper across the windshield and the friction of the pistons in the tubes.

As the piston 22 nears the closed end of its cylinder 11 member 50 will actuate the trip 40 and shift the valve 32 to the position of Fig. 3. At this time the closed end of the cylinder 12 communicates with the suction line 28 and pressures are equalized on opposite sides of the piston 22. Piston 24 will therefore be drawn to the left until such time as the block 43 operates the trip 40 and again shifts the valve. The cycle of the operation above described then again takes place.

To guard against possible damage or wear caused by either piston striking the closed end of its cylinder, cushioning springs such as 55 may be employed.

Obviously, various changes and alterations might be made in the general form and arrangement of parts described without departing from the invention. Hence I do not wish to limit myself to the details set forth, but shall consider myself at liberty to make such changes and alterations as fairly fall within the spirit and scope of the appended claims.

I claim:

1. An operating mechanism for reciprocating windshield wipers including a pair of parallel cylinders each open at one end and closed at the other, the open end of each cylinder being arranged adjacent the closed end of the other, valve means for alternately admitting and exhausting air through the closed ends of the cylinders, a piston in each cylinder and a flexible device connecting the pistons.

2. An operating mechanism for reciprocating windshield wipers including a pair of parallel cylinders each open at one end and closed at the other, the open end of each cylinder being arranged adjacent the closed end of the other, valve means for alternately admitting and exhausting air through the closed ends of the cylinders, a piston in each cylinder and a flexible device connecting the pistons, and pulleys at the open ends of the cylinders over which the flexible device is led.

3. An operating mechanism for reciprocating windshield wipers including a pair of parallel cylinders each open at one end and closed at the other, the open end of each cylinder being arranged adjacent the closed end of the other, valve means for alternately admitting and exhausting air through the closed ends of the cylinders, a piston in each cylinder and a flexible device connecting the pistons, means actuated by the flexible device for shifting the valve means.

4. A device as set forth in claim 1 wherein the cylinders are formed in a common block and said block provides a central passageway between the cylinders through which the flexible device passes.

5. An operating mechanism for reciprocating windshield wipers including a pair of cylinders each open at one end and closed at the other, valve means for alternately admitting and exhausting air through the closed ends of the cylinders, a piston in each cylinder, and a flexible device connecting the pistons through the open ends of the cylinders, said flexible device adapted to be operatively connected to a windshield wiper.

DAVID KUSKIN.